United States Patent [19]

Robinson

[11] Patent Number: 4,719,082
[45] Date of Patent: Jan. 12, 1988

[54] VINYL SULFONIC ACID - METHACRYLIC ACID COPOLYMER PASSIVATORS FOR HIGH PRESSURE BOILERS

[75] Inventor: Robert S. Robinson, Naperville, Ill.

[73] Assignee: Nalco Chemical Company, Naperville, Ill.

[21] Appl. No.: 896,790

[22] Filed: Aug. 15, 1986

[51] Int. Cl.$^4$ ............................................. C23F 11/06
[52] U.S. Cl. ..................................... 422/13; 210/701; 252/395; 422/17
[58] Field of Search .............................. 210/698–701; 252/180, 181, 395; 422/13, 17

[56] References Cited

U.S. PATENT DOCUMENTS

| | | | |
|---|---|---|---|
| 3,879,288 | 4/1975 | Siegele | 210/701 |
| 4,387,027 | 6/1983 | May et al. | 210/697 |
| 4,457,847 | 7/1984 | Lorenc et al. | 210/701 |
| 4,604,211 | 8/1986 | Kneller et al. | 422/17 |

Primary Examiner—Peter Hruskoci
Attorney, Agent, or Firm—John G. Premo; Anthony L. Cupoli; Donald G. Epple

[57] ABSTRACT

Certain polymers of vinylsulfonic and methacrylic acid promote the formation of passive, protective oxide films on steel surfaces under alkaline boiler conditions and at high pressures e.g. pH 11 1,000 to 1,500 psi, while giving good control of mineral deposition in the boiler.

2 Claims, 1 Drawing Figure

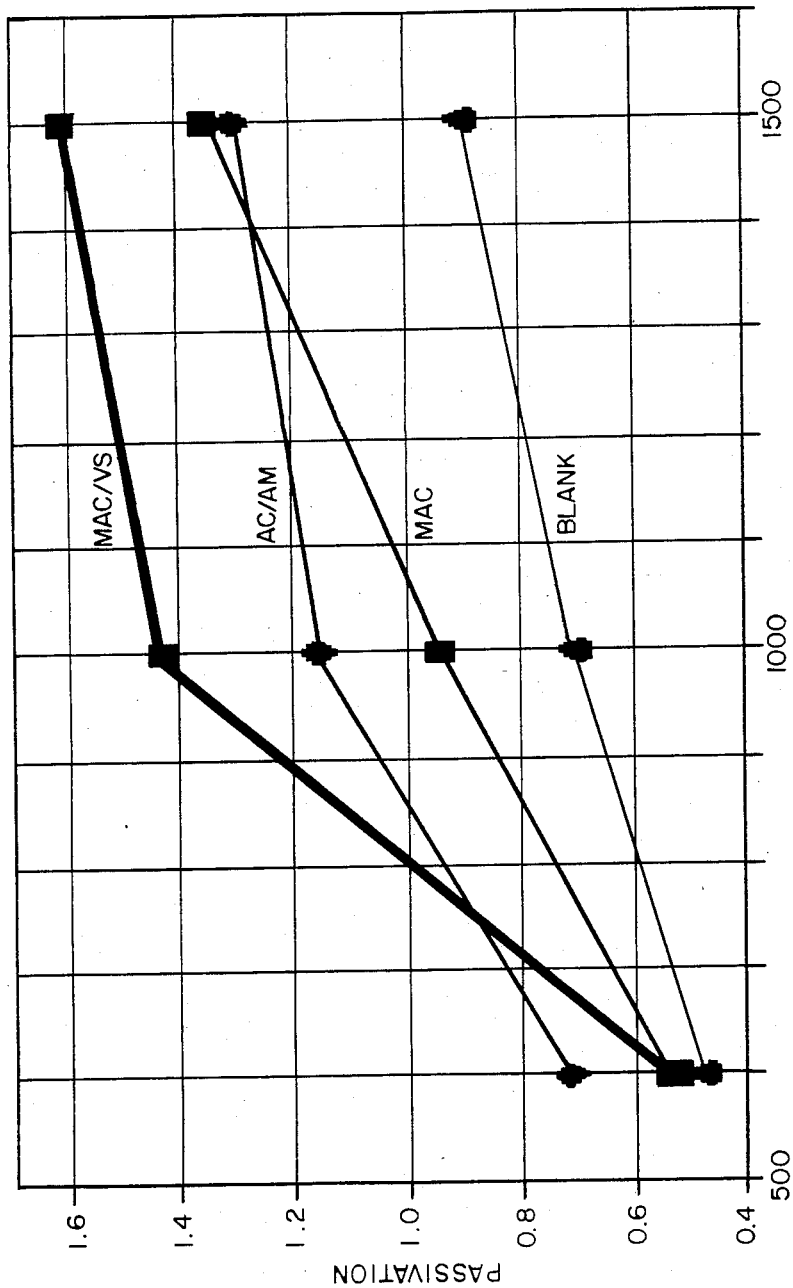

VINYL SULFONIC ACID - METHACRYLIC ACID COPOLYMER PASSIVATORS FOR HIGH PRESSURE BOILERS

INTRODUCTION

High pressure boilers, e.g. those operating over 1,000 psi, are susceptible to corrosion due to the elevated temperature of the water contained in these units. The material of construction of boilers is primarily of ferrous metals which quickly corrode due to the presence of oxygen, carbon dioxide, etc., as well as the presence of certain chemicals that are added to the boiler water for various purposes.

One method of inhibiting this type of corrosion is to treat the boiler water with a passivating inhibitor. These inhibitors enhance the formation of a protective black iron oxide coating, e.g., magnetite, on the ferrous metal surfaces in contact with the water or the steam produced therefrom. Typical of such inhibitors capable of producing these magnetite type films are certain water-soluble polymers such as the polymers of acrylic acid and acrylamide.

Oxide films are known to form on steel in high purity water without a passivating agent under boiler conditions, but the oxide formed in the presence of passivator shows considerably greater corrosion resistance.

An example of water-soluble polymers capable of passivating ferrous metal surfaces in contact with boiler waters is described in U.S. Pat. No. 4,457,847 in column 11. The particular polymer treatment used was a blend of polymers which blend consisted of an acrylic acid-acrylamide copolymer (3:1 mole ratio) and a vinyl sulphonate-acrylic acid copolymer (1:3 mole ratio). The polymers in this blend had molecular weights below 50,000.

The present invention provides an improved water-soluble low molecular weight copolymer treatment, which when used for internal boiler scale control, causes the formation of passive films which are significantly more corrosion resistant than films formed during treatment with, for instance, only polyacrylic acid, polymethacrylic acid, a Commercial Polymer[1], phosphate, or no treatment.

[1] 75/25 weight percent acrylic acid acrylamide copolymer MW=30,000

THE INVENTION

The invention is a method of passivating the ferrous metal surfaces in contact with boiler waters under a pressure of at least 1,000 psi. This passivation is achieved by causing the formation of a magnetite film on these ferrous metal surfaces by treating the boiler water with a corrosion inhibiting amount of a water-soluble copolymer. This polymer contains vinyl sulphonate and at least 50 mole percent of a methacrylic acid. It has a molecular weight between 10,000–75,000.

MOLECULAR WEIGHT

The polymers have molecular weights within the range of 10,000–75,000 with a preferred molecular weight being between 20,000–50,000. These molecular weights are weight average molecular weights.

COMPOSITION OF THE POLYMER

As indicated, the polymers contain at least 50 weight percent of methylacrylic acid, preferably at least 80 weight percent and most preferably 95 weight percent with the remainder being vinyl sulfonic acid in a water-soluble salt form.

DOSAGE

The polymers of the invention are added to the boiler waters to provide between 0.5–500 ppm with a preferred dosage being within the range of about 5–70 ppm. At these dosages, a good black metal oxide film is formed on the boiler.

BOILER WATER PRESSURE AND PH

The invention is primarily directed to treating boiler waters used to generate steam at pressures of at least 1,000 psi and preferably 1,500 psi or greater. While the polymer may be used to treat boilers operating at lower pressures, they are not quite as effective. The pH of these boilers is usually greater than 10.5 and rarely exceeds 13.5.

ADVANTAGES OF THE INVENTION

1. The vinylsulfonic acid-methacrylic acid copolymer gives no hydrolytic release of ammonia, which can cause corrosion of copper-containing alloys.

2. The use of a methacrylic acid backbone gives higher thermal stability. This effect is observable at higher pressures. At 1,500 psi, copolymers containing greater than 80% methacrylic acid showed better passivation than similar copolymers of acrylic acid.

3. The passivating effect of the vinylsulfonic acid comonomer is only observed in its copolymers with methacrylic acid. The corresponding vinylsulfonic acid/acrylic acid copolymer shows no passivation enhancement compared to polyacrylic acid.

4. The passivation enhancement characteristics of the methacrylic acid backbone allows small levels of monomer incorporation to be effective in promoting boiler metal passivation. Even at less than 10% comonomer incorporation, such copolymers showed passivation performance comparable or superior to a copolymer of acrylic acid/acrylamide containing 25% acrylamide.

5. Physical mixtures of homopolymers in the same ratio found in the corresponding copolymers showed no significant enhancement in protective oxide film formation over that found with polyacrylic acid or polymethacrylic acid.

6. An important advantage of the invention is that the copolymers used to prevent corrosion, as taught herein, also have the ability to inhibit scale. The dosage for scale prevention can vary. If threshold inhibition is sought, only a fraction of a ppm for each 1 part of scale expressed as calcium is needed. If excellent scale prevention and cleaning is sought, than high dosages such as those taught in U.S. Pat. No. 4,457,847, the disclosure of which is incorporated herein by reference, may be used.

BRIEF DESCRIPTION OF THE DRAWING

The drawing shows improved passivation obtained with the polymers of the instant invention.

EVALUATION OF THE INVENTION

The experiments were done in an experimental boiler as described in the paper, "The Investigation of Scaling and Corrosion Mechanisms Using Process Simulation," by J. A. Kelly, P. T. Colombo, and G. W. Flasch, paper No. IWC-80-10 given at the 41st Annual Meeting, International Water Conference, Pittsburgh, Pa., Oct. 20–22, 1980.

RESULTS

A comparison of the passivation enhancement of the methacrylic/vinylsulfonic acid copolymer of the invention with the Commercial Polymer is shown in the Table. The passivation values are normalized to that of a methacrylic acid homopolymer.

At 1,500 psi, copolymers containing greater than 80% methacrylic acid showed better passivation than copolymers of acrylic acid. This is due to the higher thermal stability and improved passivation of the methacrylic acid polymers.

TABLE

| | Passivation of Polymers (normalized) | | | |
|---|---|---|---|---|
| Pressure(psig) | Blank[1] | MAc[2] | Commercial Polymer | MAc/VS[3] |
| 600 | 0.89 | 1.0 | 1.34 | 1.0 |
| 1,000 | 0.74 | 1.0 | 1.23 | 1.52 |
| 1,500 | 0.66 | 1.0 | 0.96 | 1.19 |

[1]Blank = no treatment, feedwater pH adjusted to 10.0.
[2]MAc = methacrylic acid
[3]MAc/VS = 95/5 wt % methacrylic acid/vinylsulfonic acid copolymer All polymers tested in the Table had a molecular weight of about 30,000.

The results of the test are presented in the drawing.

The absolute values of the measurements are shown in the drawing, rather than the normalized values, as in the Table.

Having thus described my invention, it is claimed as follows:

1. A method of passivating the ferrous metal surfaces in contact with boiler waters having a pH of at least 10.5 under a pressure of at least 1,000 psi by causing the formation of a magnetite film on such ferrous metal surfaces which comprises treating the boiler water with from 0.5–500 ppm of a water soluble copolymer which contains from about 5–20 mole percent vinyl sulfonate and from 80–95 mole percent of methacrylic acid, which water-soluble copolymer has a molecular weight between 20,000–50,000.

2. The method of claim 1 wherein the polymer contains 95 mole percent of methacrylic acid.

* * * * *